US012764510B2

(12) United States Patent
Dizengof et al.

(10) Patent No.: US 12,764,510 B2
(45) Date of Patent: Oct. 13, 2026

(54) OVER-THE-TOP DELIVERY OF REMOTELY PROCESSED EMERGENCY CALLS AUDIO TO DISPATCHER TERMINALS

(71) Applicant: Carbyne Ltd., Tel-Aviv (IL)

(72) Inventors: Alexander Dizengof, New York, NY (US); Roman Malih, New York, NY (US)

(73) Assignee: Carbyne Ltd., Tel-Aviv (IL)

( * ) Notice: Subject to any disclaimer, the term of this patent is extended or adjusted under 35 U.S.C. 154(b) by 330 days.

(21) Appl. No.: 18/439,799

(22) Filed: Feb. 13, 2024

(65) Prior Publication Data

US 2025/0260962 A1 Aug. 14, 2025

(51) Int. Cl.
*H04W 4/90* (2018.01)
*H04W 76/50* (2018.01)
*H04W 92/06* (2009.01)

(52) U.S. Cl.
CPC ............. *H04W 4/90* (2018.02); *H04W 76/50* (2018.02); *H04W 92/06* (2013.01)

(58) Field of Classification Search
CPC ....... H04W 4/90; H04W 4/029; H04W 76/50; H04W 4/023; G06F 40/47
USPC ........................................................ 455/404.1
See application file for complete search history.

(56) References Cited

U.S. PATENT DOCUMENTS 7,289,493 B1 * 10/2007 Vera ..................... H04Q 3/0029
370/352
9,148,512 B1 9/2015 Kumar et al.
9,648,171 B1 * 5/2017 Eftekhari ............ H04M 3/5232
10,122,682 B1 11/2018 Salour et al.
11,277,729 B1 * 3/2022 Dizengof ................ H04L 12/66
11,589,205 B2 2/2023 Chiang et al.
2006/0265088 A1 11/2006 Warford et al.
2009/0175422 A1 7/2009 Marics et al.
2010/0120395 A1 * 5/2010 Chiba ................... H04W 76/50
455/404.2

(Continued)

FOREIGN PATENT DOCUMENTS

EP 2475426 11/2015
WO WO 2025/172997 8/2025

OTHER PUBLICATIONS

International Search Report and the Written Opinion Dated Apr. 28, 2025 From the International Searching Authority Re. Application No. PCT/IL2025/050140 (9 Pages).

*Primary Examiner* — Maria El-Zoobi

(57) ABSTRACT

A system for delivering over-the-top voice of incoming emergency calls to dispatchers' terminals at emergency dispatch centers, comprising a network gateway deployed in an emergency dispatch center and a remote server. The network gateway is adapted for transmitting, via a network, IP packets encapsulating audio data extracted from one or more of a plurality of incoming emergency calls received at the emergency dispatch center where the audio data of each emergency call is associated with an extension ID of a respective one of a plurality of dispatcher terminals assigned to take and handle the respective emergency calls at the emergency dispatch center. The remote server is adapted for receiving, via the network, the IP packets encapsulating the audio data, extracting the audio data, processing the audio data, and transmitting the processed audio data relating to each emergency call to one of the dispatcher terminals according to the extension ID.

17 Claims, 4 Drawing Sheets

(56) References Cited

U.S. PATENT DOCUMENTS

| | | | | |
|---|---|---|---|---|
| 2010/0324884 | A1 | 12/2010 | Jeffrey | |
| 2011/0276326 | A1 | 11/2011 | Fumarolo et al. | |
| 2022/0201456 | A1 * | 6/2022 | Chiang | G06F 40/58 |
| 2023/0014760 | A1 * | 1/2023 | Martin | H04W 4/90 |
| 2023/0066525 | A1 * | 3/2023 | Cabanas | H04W 4/029 |

* cited by examiner

OVER-THE-TOP DELIVERY OF REMOTELY PROCESSED EMERGENCY CALLS AUDIO TO DISPATCHER TERMINALS

BACKGROUND

The present invention, in some embodiments thereof, relates to delivery of audio content of incoming emergency calls to dispatcher terminals at emergency dispatch centers, and, more specifically, but not exclusively, to over-the-top delivery of audio content of incoming emergency calls that is processed remotely to dispatcher terminals at emergency dispatch centers.

In order to simplify and expedite accesses to various emergency services, many countries have established joint emergency dispatch centers, for example, the 911 service (in the US), the 112 service (in Europe) which serve to receive incoming emergency calls relating to reports of any type of emergency event.

Such joint emergency dispatch centers are typically manned by dispatchers trained to briefly interrogate the reporters and asses the emergency events to decide based on information provided by the reporters which emergency service is best suitable to respond to each of the reported emergency events and route the incoming emergency calls to the respective emergency service accordingly.

One of the key factors in improving and optimizing the operation of the dispatchers to effectively respond to the emergency events reported by the emergency calls is the ability to collect and extract comprehensive incident data from the emergency calls to derive accurate insights and/or conclusions, make educated assessments, identify patterns and/or the like.

SUMMARY

It is an object of the present invention to provide, methods, systems and software program products for processing audio of emergency calls received at emergency dispatch centers, specifically remotely processing the emergency calls audio, for example, using cloud service(s) and deliver the processed audio to terminals used by dispatchers handling the emergency calls. The foregoing and other objects are achieved by the features of the independent claims. Further implementation forms are apparent from the dependent claims, the description and the figures.

According to a first aspect of the present invention there is provided a system for delivering over-the-top voice of incoming emergency calls to dispatchers' terminals at emergency dispatch centers, comprising a network gateway deployed in an emergency dispatch center and a remote server. The network gateway is adapted for transmitting, via a network, Internet Protocol (IP) packets encapsulating audio data extracted from one or more of a plurality of incoming emergency calls received at the emergency dispatch center. The audio data of the one or more emergency calls is associated with an extension identifier (ID) of a respective one of a plurality of dispatcher terminals assigned to take and handle the one or more emergency calls at the emergency dispatch center. The remote server is adapted for receiving, via the network, the IP packets encapsulating the audio data of the one or more emergency calls, extracting the audio data, processing the audio data, and transmitting the processed audio data relating to the one or more emergency calls to a respective one of the plurality of dispatcher terminals according to the extension ID.

According to a second aspect of the present invention there is provided a computer implemented method of delivering over-the-top voice of incoming emergency calls to dispatchers' terminals at emergency dispatch centers, comprising using one or more processors of a remote server for:

Receiving, via a network, IP packets from a network gateway deployed in one or more emergency dispatch centers. The IP packets encapsulate audio data extracted from one or more of a plurality of incoming emergency calls received at the one or more emergency dispatch centers. The audio data of the one or more emergency calls is associated with an extension identifier (ID) of a respective one of a plurality of dispatcher terminals assigned to take and handle the one or more emergency calls at the one or more emergency dispatch centers.

Extracting the audio data.

Processing the audio data.

Transmitting the processed audio data relating to the one or more emergency calls to a respective one of the plurality of dispatcher terminals according to the extension ID.

In a further implementation form of the first, and/or second aspects, the plurality of incoming emergency calls are received via one or more call handling systems deployed at the emergency dispatch center. The one or more call handling systems are adapted to route each of the plurality of incoming emergency call to a respective one of the plurality of dispatcher terminals. An extension mapping reflects the association of each of the plurality of incoming emergency calls with a respective one of the plurality of dispatcher terminals assigned to take and handle the respective incoming emergency call.

In a further implementation form of the first, and/or second aspects, the extension mapping is embedded in the IP packets encapsulating the audio data of the one or more emergency calls.

In a further implementation form of the first, and/or second aspects, at least some of the plurality of incoming emergency calls are received via one or more legacy call handling systems incapable of transmitting IP packets encapsulating data extracted from one or more of the at least some incoming emergency calls.

In a further implementation form of the first, and/or second aspects, one or more serial data encapsulation devices adapted for encapsulating data received in serial format are deployed in the emergency dispatch center to encapsulate in IP packets data extracted from the least some incoming emergency calls received from the one or more legacy call handling systems in serial data format.

In an optional implementation form of the first, and/or second aspects, the system further comprises one or more serial-to-IP converters deployed in the emergency dispatch center. The one or more serial-to-IP converters are adapted to receive the extension mapping from the one or more legacy call handling systems in serial format via one or more serial communication channel, encapsulate the extension mapping in one or more IP packets, and transmit the one or more IP packets encapsulating the extension mapping to the remote server.

In a further implementation form of the first, and/or second aspects, the remote server is utilized by one or more cloud services.

In a further implementation form of the first, and/or second aspects, the network gateway is configured to encrypt one or more of the IP packets.

In a further implementation form of the first, and/or second aspects, the network gateway is configured to sign one or more of the IP packets.

In a further implementation form of the first, and/or second aspects, one or more of the plurality of incoming emergency calls are identified using an Automatic Number Identifier (ANI)/Automatic Location Identification (ALI) service.

In a further implementation form of the first, and/or second aspects, the processing of the audio data of one or more of the emergency calls comprises associating the audio data with other data relating to the one or more emergency call at the respective one of the plurality of dispatcher terminals. The other data is a member of a group consisting of: video data, location data, and/or incident data relating to an emergency event reported by the one or more emergency call.

In a further implementation form of the first, and/or second aspects, the processing of the audio data of one or more of the emergency calls is conducted in real-time while the one or more emergency calls are in progress.

In a further implementation form of the first, and/or second aspects, the processing of the audio data of one or more of the emergency calls comprises translating the audio data to one or more language different from an original language of the one or more emergency calls.

In a further implementation form of the first, and/or second aspects, the processing of the audio data of one or more of the emergency calls comprises generating a transcript of the one or more emergency calls.

In a further implementation form of the first, and/or second aspects, the processing of the audio data of one or more of the emergency calls comprises estimating one or more emotional, behavioral, and/or sentimental attributes of one or more users who initiated one or more of the plurality of emergency calls.

In a further implementation form of the first, and/or second aspects, the processing of the audio data comprises computing analytics for at least some of the plurality of emergency calls received at the emergency dispatch center based on analysis of the audio data of the at least some emergency calls.

In an optional implementation form of the first, and/or second aspects, the network gateway further comprises a plurality of network ports for transferring data relating to the plurality of incoming emergency calls to the plurality of dispatcher terminals.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1A:
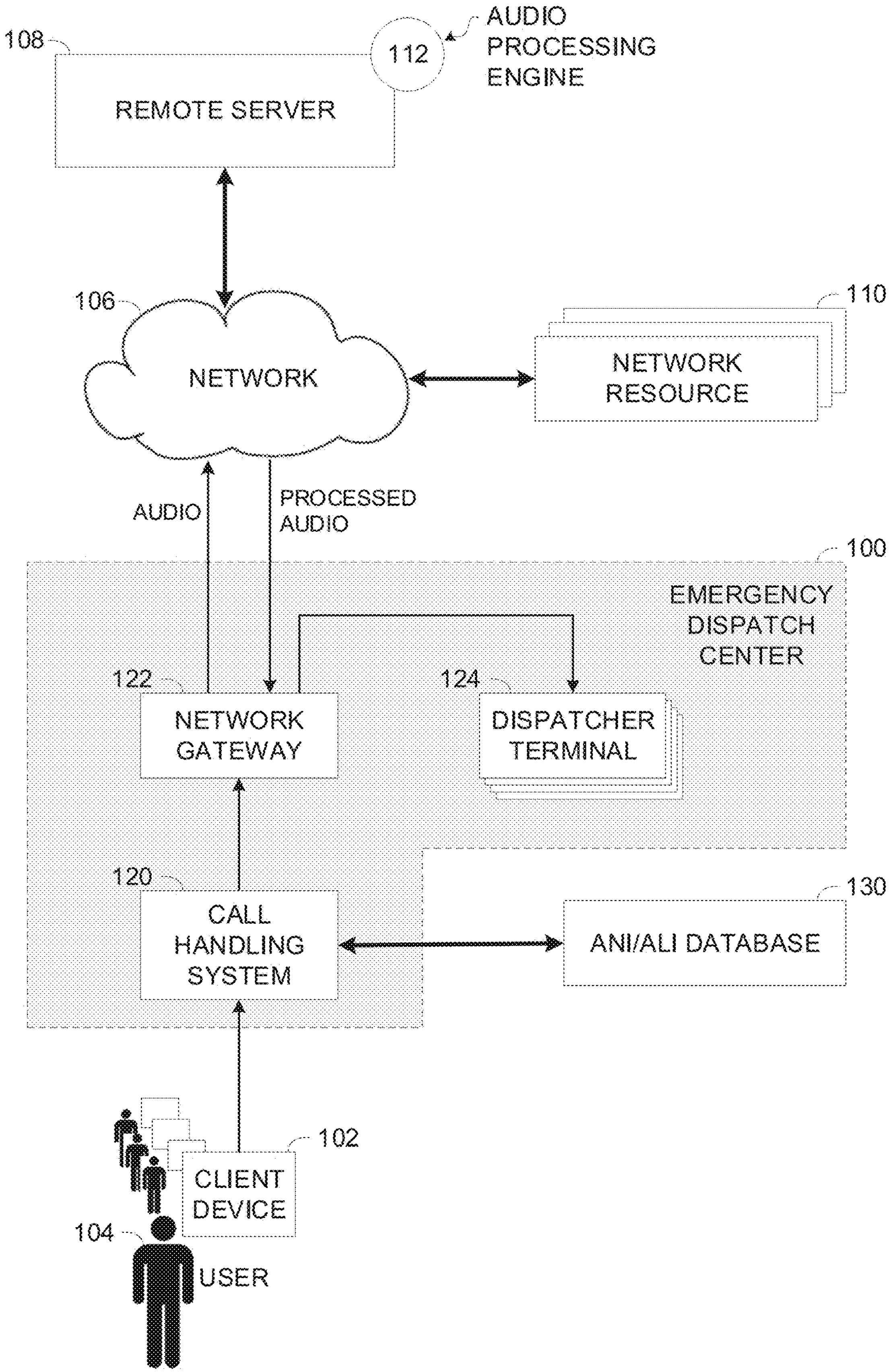
FIG. 1A, FIG. 1B and FIG. 1C are schematic illustrations of an exemplary system for over-the-top delivery of processed audio of emergency calls to dispatcher terminals at an emergency dispatch center, according to some embodiments of the present invention.

The present invention, in some embodiments thereof, relates to delivery of audio content of incoming emergency calls to dispatcher terminals at emergency dispatch centers, and, more specifically, but not exclusively, to over-the-top delivery of audio content of incoming emergency calls that is processed remotely to dispatcher terminals at emergency dispatch centers.

According to some embodiments of the present invention, there are provided methods, systems and computer program products for remotely processing audio data (content)

extracted from emergency calls received at emergency dispatch centers such as, for example, 911 service in the US, 112 service in Europe, and/or the like and delivering the processed audio data to dispatcher terminals used by dispatchers at the emergency dispatch centers.

In particular, the processed audio data is delivered (provided) to the dispatcher terminals over-the-top, i.e., in a channel different than the channel used originally and/or typically used to route the incoming emergency call to the dispatcher terminals. For example, the incoming emergency calls are typically routed to the dispatcher terminals by one or more call handling systems deployed at the emergency dispatch centers. Over-the-top delivery uses other channels, for example, high-speed IP based networks bypassing the call handling systems, to deliver data, for example, the processed audio data to the dispatcher terminals at the emergency dispatch center. At the dispatcher terminals the processed audio may be associated with the emergency calls from which the audio was originally extracted.

Processing data extracted from the incoming emergency calls, specifically audio data (content) of the calls, for example speech, voice, sound, and/or the like may be conducted for a plurality of goals and/or objectives, for example, optimizing dispatch center operation by improving, complementing and/or extending dispatchers view of the emergency events reported in the emergency calls, generating analytics characterizing the incoming emergency calls, and/or the like.

Processing of the audio data may comprise, for example, translating the audio content, creating transcripts (written text transcripts) of the audio content, and/or the like. In another example, processing the audio content may include analyzing the audio data to identify, estimate, and/or classify one or more user attributes of one or more of the users (reporters) of initiated the emergency calls to report of the emergency events. In another example, processing the audio content may include computing analytics based on the audio data of a plurality emergency calls which may be used to identify, estimate, and/or classify profiles, patterns, distributions, segmentations, and/or the like relating to one or more aspects of the emergency calls, for example, incident distributions, reporters profiles, response patterns, and/or the like.

In order to facilitate remote processing of data extracted from the incoming emergency calls, specifically audio data (content) of the emergency calls, for example speech, voice, sound, and/or the like one or more network gateways may be deployed at each emergency dispatch center for transferring the audio data to one or more remote servers, cloud computing systems, services, platforms and infrastructures, and/or the like, collectively designated remote server herein after.

As communication between the network gateway(s) and the remote server is done via Internet Protocol (IP) based networks, the network gateway(s) may transmit to the remote server IP packets encapsulating the data, for example, audio data, extracted from the incoming emergency calls.

In order for the remote server to transmit the processed audio of each emergency call to the specific dispatcher terminal used by the despatcher assigned to take and handle the respective emergency call, the remote server needs to identify an extension identifier (ID) (interchangeably designated station ID) of the specific dispatcher terminal.

To this end, the remote server may receive extension mapping which maps the call ID of each emergency call to the dispatcher terminal, specifically to the extension ID of the respective dispatcher terminal assigned to take and handle the respective emergency call.

According to some embodiments, the extension mapping may be embedded in the IP packets transmitted by the network gateway(s) to the remote server which encapsulate the audio data.

However, some emergency dispatch centers may be deployed with legacy call handling systems which are unable to connect to IP based networks and transfer IP packets. Therefore according to some embodiments, in such deployments, one or more serial-to-IP converters may be deployed at such emergency dispatch centers to receive the extension mapping, encapsulate it in IP packets and transmit the IP packets encapsulating the extension mapping to the remote server.

Processing audio data extracted from emergency calls received at emergency dispatch centers, and moreover remotely processing the audio data at remote servers, and/or cloud services may present major benefits and advantages.

First, providing processed data, for example emergency calls audio data processed to create translation, transcript, user state classification, analytics, and/or the like to dispatchers at the emergency dispatch centers may significantly enhance, broaden, and/or clarify view of the emergency event for the dispatchers thus significantly improving their response performance, for example, efficiency, speed, accuracy, and/or the like to the emergency events reported via the emergency calls.

Moreover, it may be highly effective and efficient to remotely process data extracted from the incoming emergency calls, specifically the audio data since the remote server(s), for example, cloud service may facilitate extensive computing resources, for example, processing resources, storage resources, networking resources, and/or the like thus allowing for high performance, low latency and/or high bandwidth processing of the audio data extracted from the emergency calls received at the emergency dispatch centers. As such, complex Natural Language Processing (NLP) models and/or algorithms may be employed to extend the audio processing, for example, support translation and/or transcript in more languages, process increased volume of data for enhance analytics, and/or the like.

Furthermore, the remote high performance data processing may be accomplished with little and potentially no need for adding, updating, and/or upgrading equipment at the emergency dispatch centers. This may enable simple integration and/or deployment of the audio data processing capabilities in of practically any emergency dispatch center including legacy emergency dispatch centers thus significantly increasing adoption of the audio data processing for emergency dispatch services.

The remote high performance data processing may also This may significantly reduce the on-site equipment required at the emergency dispatch centers thus significantly reducing cost, effort, complexity, and/or the like of their deployment, maintenance, and/or upgrade.

While extremely high performance in terms of data processing, the remote processing may enable efficient, real-time delivery of the processed audio data to the dispatchers' terminals since it is done over-the-top via high performance networks, for example, IP based networks, characterized by high data throughput, low latency, high data integrity, data security (e.g., via encryption of transferred data) m, and/or the like.

Using remote resources (i.e., remote servers, cloud services) for processing the audio data may also enable high scalability of computing resources which may be available in abundance at the remote server as opposed to fixed and often limited computing resources available at each emergency dispatch center.

In addition, updating, upgrading, and/or extending the audio processing capabilities, functionality, and/or features may be done centrally at the remote server serving a plurality of emergency dispatch centers rather than updating each emergency dispatch center separately thus significantly reducing update effort, cost, and/or complexity.

Also, as the remote server may process emergency calls data, specifically audio data collected from a plurality of emergency dispatch centers, higher level and more extensive analytics may be generated based on the significantly larger and potentially more diverse emergency calls. The extensive analytics may yield more accurate, more extensive and/or more comprehensive insights, patterns, profiles, and/or the like which may be applied for further improving response performance at the emergency dispatch centers.

Finally, remotely processing the data relating to incoming emergency calls received at the emergency dispatch centers, specifically the audio data extracted from the emergency calls may significantly improve data sharing capabilities between different stakeholders due to the centralization of data processing at the remote server which typically is highly more accessible over the network compared to the on-site equipment at the emergency dispatch centers in terms of network bandwidth, latency, throughput, data security, and/or the like Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
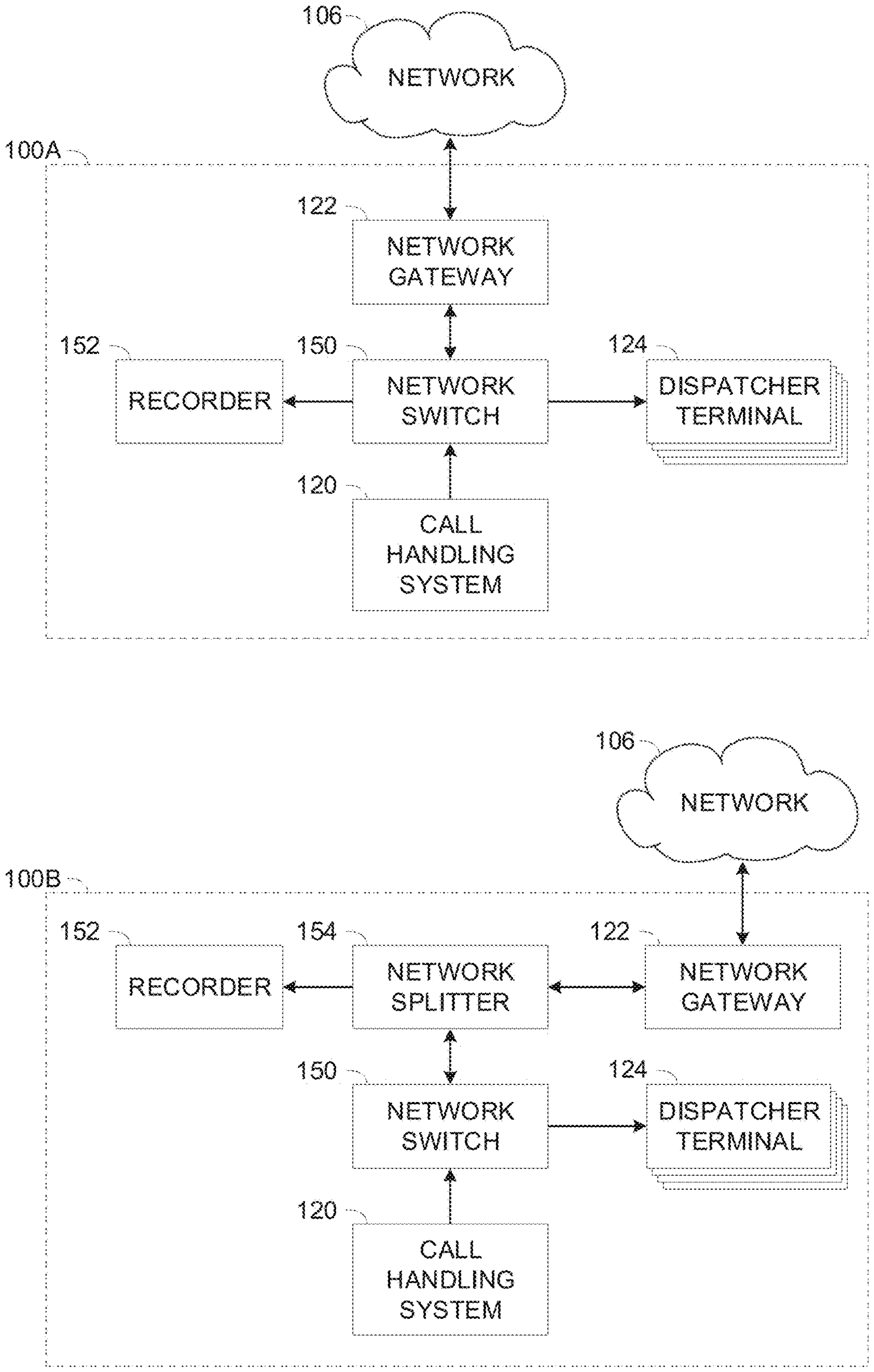
Figure 1C:
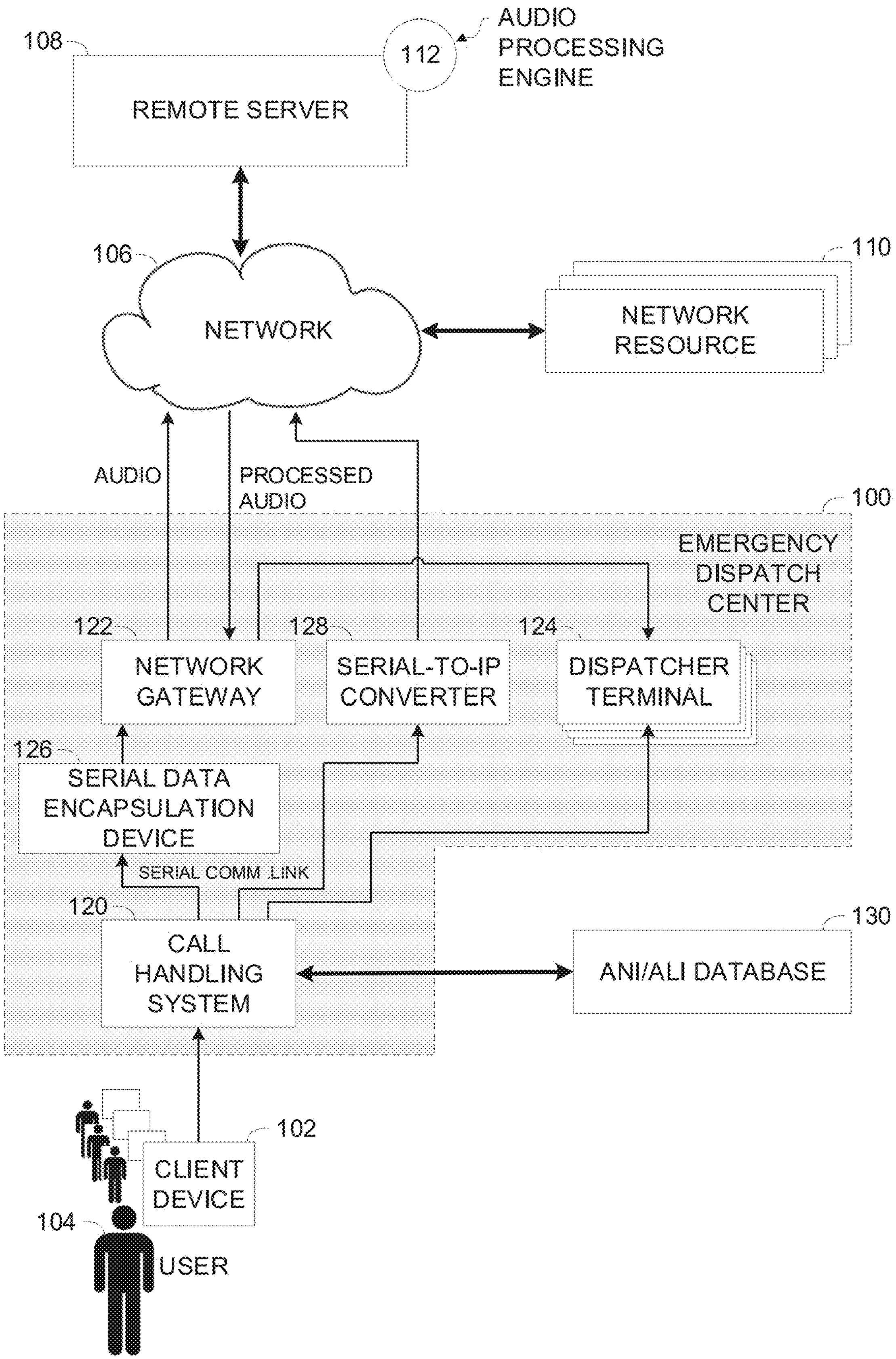

Referring now to the drawings, FIG. 1A, FIG. 1B and FIG. 1C are schematic illustrations of an exemplary system for over-the-top delivery of processed audio of emergency calls to dispatcher terminals at an emergency dispatch center, according to some embodiments of the present invention.

As seen in FIG. 1A, one or more client devices 102, for example, a landline telephone, a Smartphone, a tablet, a wearable device, a computer, a laptop and/or the like may be used by one or more users (reporters) 104 to initiate emergency calls in order to report of one or more potential emergency events to one or more emergency dispatch centers 100, for example, a Public Safety Answering Point (PSAP), and/or the like.

As common for emergency dispatch centers 100 around the world, the emergency events reported by the user 104 may span a wide range of emergency events including potentially high threat and dangerous events, for example, violence incidents (e.g., gunfire, fight, rape, kidnap, terrorist attack, etc.), accidents (e.g., car accident, structure collapse, etc.), fire, natural disasters, and/or the like as well as low severity events, for example, water pipe rapture, public property vandalism, lost pet and/or the like.

It should be noted that the while this disclosure addresses emergency dispatch centers 100 as exemplary, this is only an exemplary embodiment and embodiments described herein may apply to other call centers, call response services and/or the like, for example, admin calls, a municipal services call center, a utilities service call center (e.g., energy, electricity, water, etc.), a commercial call center, and/or the like.

The incoming emergency calls received from the client devices 102 may be typically received by one or more call handling systems 120 deployed in the emergency dispatch center 100. The call handling system(s) 120 may be configured to receive and handle the incoming emergency calls, i.e., the incoming emergency calls. For example, one or more call handling systems 120 may be configured to receive and handle incoming phone calls originating and/or delivered according to one or more standards and/or protocols, for example, originating from landline phones and/or cellular phones. In another example, one or more call handling systems 120 may be configured to receive and handle incoming phone calls received via one or more Public Switched Telephone Networks (PSTN). Optionally, one or more call handling systems 120 may be configured to receive and handle incoming phone calls received via one or more IP, and/or VoIP systems, networks, and/or protocols.

As part of reception and handling of the incoming emergency calls, the call handling system 120 may be adapted to collect and deliver audio data of the incoming emergency calls, for example, speech, sound, and/or the like.

Optionally, the call handling system 120 may communicate with one or more ANI/ALI databases and/or services 130 provided by one or more phone service providers to receive, for example, fetch, retrieve, and/or obtain ANI/ALI data relating to one or more of the incoming emergency calls as known in the art. Based on the ANI/ALI data received from the ANI/ALI database(s) 130, the call handling system 120 may identify one or more attributes of the one or more of the incoming emergency calls. For example, based on the ANI/ALI data retrieved from the ANI/ALI database(s) 130, the call handling system 120 may identify an origin and/or location of one or more client devices 102 from which one or more of the incoming emergency calls originate, for example, an address of the originating landline phone (if applicable), a location of the originating cellular phone (if applicable) computed, for example, based on location of receiving cellular base stations (e.g. triangulation, etc.) and/or the like.

It should be noted that communication equipment, methods and/or protocols used by the call handling system 120 for communicating with the ANI/ALI database 114 are known in the art and are out of scope of this disclosure. For brevity, the call handling system 120 is described to directly communicate with the ANI/ALI database 114. However, as would be evident for a person skilled in the art the exact deployment and connection between the call handling system 120 and the ANI/ALI database 114 may be different and include additional elements (not shown in FIGS. 1A-C) as known in the art.

One or more network gateways 122 may be deployed in the emergency dispatch center 100 to receive the incoming emergency calls from the call handling system(s) 120, typically encapsulated in Internet Protocol (IP) packets and distribute the IP packets containing data of the emergency calls and/or part thereof, for example, audio data (speech, sound) to one or more onsite and/or offsite devices, apparatuses, systems and/or services.

The network gateway 122 may transmit the IP packets containing the emergency calls data via one or more wired and/or wireless IP based networks, for example, a Local Area Network (LAN), a Wireless LAN (WLAN), a Wide Area Network (WAN), a Municipal Area Network (MAN), a cellular network, the internet and/or the like which are the backbone communication infrastructure for onsite and/or offsite communication for most if not all modern emergency dispatch centers 100.

The network gateway 122 may comprises a plurality of network ports, interfaces, and/or links, implemented through hardware, software, and/or a combination thereof for transferring data, specifically data relating to the incoming emergency calls, between a plurality of network nodes onsite the emergency dispatch center 100 and/or offsite.

For example, the network gateway 122 may forward IP packets encapsulating data of the incoming emergency calls and/or part thereof to one or more dispatcher terminals 124 deployed in the emergency dispatch center 100 via one or more IP based wired and/or wireless IP based networks, for example, onsite networks deployed in the emergency dispatch center 100. The dispatcher terminals 124 may be used by one or more dispatchers to receive, handle, and respond to the incoming emergency calls.

In another example, the network gateway 122 may connect to a network 106 comprising one or more wired and/or wireless networks, for example, a LAN, a WLAN, a WAN, a MAN, a cellular network, the internet and/or the like for communicating with one or more remote network resources 110, for example, a server, a cloud service, a database, and/or the like. Via the network 106, the network gateway 122 may therefore transmit IP packets encapsulating data of the incoming emergency to one or more remote servers 108.

For brevity, the description relates to a single remote server 108. This however should not be construed as limiting since, as may be apparent to a person skilled in the art, multiple remote servers 108 may be deployed to serve one or more emergency dispatch centers 100.

The remote server 108, for example, a server, a computing node, a cluster of computing nodes, and/or the like may comprise one or more processors adapted to execute one or more software modules such as, for example, a process, a script, an Operating System (OS), an application, an agent, a utility, a tool, a plug-in, an add-on, and/or the like each comprising a plurality of program instructions stored in a non-transitory medium (program store) of the remote server 108, for example, RAM, ROM, Flash, and/or the like.

Optionally, the processor(s) of the remote server 108 may include, utilize, and/or use one or more hardware elements available to the remote server 108, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator, and/or the like.

The remote server 108 may therefore execute one or more functional modules utilized by one or more software modules, one or more of the hardware elements and/or a combination thereof. For example, the remote server 108 may execute an audio processing engine 112 adapted to process and/or manipulate data, for example, audio data (e.g., voice, sound, etc.) extracted from the incoming emergency calls received at the emergency dispatch center 100.

Optionally, the remote server 108, specifically, the audio processing engine 112 may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud Platform (GCP), Microsoft Azure, Amazon Web Service (AWS) and Elastic Compute Cloud (EC2), IBM Cloud, and/or the like. The cloud service(s) may be adapted to communicate with one or more network gateways deployed at one or more emergency dispatch centers 100 to receive IP packets encapsulating audio data extracted from a plurality of incoming emergency calls received at the emergency dispatch centers 100, process the audio data and transmit the processed audio to dispatchers terminals at the emergency dispatch centers 100.

As seen in FIG. 1B, the local network at the emergency dispatch center 100 may employ one or more deployments, architectures, and/or configurations for connecting between the IP based devices, systems, and/or apparatuses at the emergency dispatch center 100, for example, for delivering, distributing and/or transferring audio data of the incoming emergency calls.

For example, a first exemplary network deployment at an exemplary emergency dispatch center 100A such as the emergency dispatch center 100 may be deployed with a network switch 150 comprising a plurality of network ports for connecting to a plurality of network nodes at the emergency dispatch center 100A, for example, the call handling system 120, the network gateway 122 and the dispatcher terminals 124 thus facilitating communication between these network nodes.

Optionally, the network switch 150 may further connect to the network one or more recorders 152 deployed at the emergency dispatch center 100A for recording one or more of the incoming emergency calls handled by dispatchers through the dispatcher terminals 124. The recorder 152 comprising storage and optionally data analysis hardware, software and/or combination thereof may be adapted to record and store, at least temporarily, data extracted from one or more selected incoming emergency calls.

In another example, in a second exemplary network deployment employed at an exemplary emergency dispatch center 100B such as the emergency dispatch center 100, rather than directly connecting the network gateway 122, the network switch 150 may connect to a network splitter 154 adapted to split the incoming network stream to a plurality of duplicate network streams.

Using the network splitter 154 may reduce deployment effort and/or cost as well as support simple integrating and/or adoption of the network gateway 122 at certain emergency dispatch centers 100 where the existing network equipment, for example, the network switch(s) 150 lack sufficient ports, links and/or interfaces for connecting additional network nodes since the use of network splitters 154 may eliminate the need to replace such existing network switches 150.

In such deployments, one or more of the network nodes at the emergency dispatch center 100B may communicate with each other via the network splitter 154. For example, the network gateway 122 may receive via the network splitter 154, IP packets encapsulating data of the incoming emergency calls which are transmitted by the call handling system 120. In another example, the network gateway 122 may forward to one or more dispatcher terminals 124 network traffic (packets) data received over the network 106, for example, from the remote server 108. In another example, IP packets comprising data of incoming emergency calls selected for recordation by the recorder 152 may be forwarded to the recorder 152 via the network splitter 154.

The network nodes at the emergency dispatch centers 100 may employ, and/or utilize one or more communication protocols for communicating with each other. For example, the network switch 150 may receive from the call handling system 120 network traffic encoded according to one or more networking protocols, for example, Session Initiation Protocol (SIP), Real-Time Transport Protocol (RTP), and/or the like. In another example, the network switch 150 may use one or more Switched Port Analyzer (SPAN) ports for duplicating network traffic, specifically IP packets encapsulating data, for example, audio data extracted from the incoming emergency calls and transmitting these packets to the network gateway 122 and/or to the recorder 152.

However, while some emergency dispatch centers 100 may be deployed with modern call handling system(s) 120 which are able to connect to IP based networks serving for transferring data in IP packets inside and/or outside the emergency dispatch center 100, some emergency dispatch centers 100 may be deployed with legacy call handling system(s) 120 which are incapable of connecting to the IP based networks.

Such legacy call handling system(s) 120 may communicate with other systems via one or more serial communication channels according to one or more serial communication protocols, for example, RS-232, RS-422, RS-485 and/or the like. The incompatibility in the communication capabilities between the call handling system(s) 120 and the communication network of the emergency dispatch center 100 may therefore prevent direct communication with the call handling system(s) 120.

As shown in FIG. 1C, to overcome this limitation, one or more of the network gateway(s) 122 may be adapted to receive the incoming emergency calls from the legacy call handling system(s) 120 via equipment adapted to encapsulate data received from legacy call handling system(s) 120 in serial communication format (form), i.e., via serial communication channel(s) employing serial communication protocol(s), in one or more IP packets. The IP packets encapsulation equipment may comprise, for example, one or more serial data encapsulation devices 126 adapted to encapsulate in IP packets at least some of the data received from the legacy call handling system(s) 120 in serial format. In another example, IP packets encapsulation equipment and/or device may be integrated in one or more other network units, for example, the network switch 150.

The network gateway 122 may then transmit the IP packets encapsulating data extracted from the incoming emergency calls to one or more of the onsite and/or offsite devices, apparatuses, systems and/or services, for example, a dispatcher terminal 124, a remote server 108, and/or the like via IP based network(s).

Moreover, modern emergency dispatch centers 100 may employ over-the-top communication between the remote server 108 and the dispatcher terminals 124 for delivering to the dispatchers additional, extended and/or more comprehensive data relating to the incoming emergency calls. To this end, each dispatcher terminal 124 may execute an over-the-top application for communicating with the remote server 108 via the IP network(s), for example, the network 106, to receive over-the-top data relating to one or more of the incoming emergency calls.

The over-the-top data may, for example, processed audio and/or speech of the incoming emergency call (e.g., translation, transcript, etc.), video relating to the emergency event, location data of the originating client device 102, analytics relating to the reporter 104, cross referencing of multiple incoming emergency calls reporting a common emergency events, and/or the like. The over-the-top data may therefore enhance context of the incoming emergency calls, provide more comprehensive and/or detailed view of the emergency events, and/or the like and may thus significantly increase efficiency of the dispatchers in handling and responding to the emergency events, reduce response time, improve response quality, and/or the like.

The remote server 108 may transmit over-the-top data relating to a respective incoming emergency call to the dispatcher terminal 124 to which the respective incoming emergency call was directed (routed), i.e., the dispatcher terminal 124 assigned to receive and handle the respective incoming emergency call. The remote server 108 may identify the appropriate dispatcher terminal 124 assigned to receive and handle each incoming emergency call according to a call identifier (ID) of the respective incoming emergency call and an extension ID (station ID) of the dispatcher terminal 124 assigned to receive the respective incoming emergency call.

Mapping (association) of the call IDs of the incoming emergency calls to the extension IDs of the dispatcher terminal 124 assigned to receive the incoming emergency calls may be obtained from one or more sources. For example, the mapping of the call IDs to the extension ID may be received from the call handling system 120. In another example, the mapping of the call IDs to the extension ID may be done by the network gateway 122.

The mapping of the audio extracted from each incoming emergency call to the extension ID of the respective one of the plurality of dispatcher terminals 124 assigned to handle the respective emergency call may transmitted to the remote server 108 via the IP packets encapsulating the audio data.

However, as stated herein before, some of the emergency dispatch centers 100 may be deployed with legacy call handling system(s) 120 which are incapable of connecting to the IP based networks. Such legacy call handling system(s) 120, which are decoupled from the distribution process of the incoming emergency calls conducted via the network gateway 122, may be therefore unable to track and/or derive the mapping of the call ID of each incoming emergency call to the extension ID of the dispatcher terminal 124 assigned to receive and handle the respective incoming emergency call.

This limitation may prevent the remote server 108 to efficiently identify the respective dispatcher terminal 124 assigned to receive and handle each incoming emergency call thus preventing effective over-the-top data transmission to the dispatcher terminals 124.

To overcome this limitation, one or more serial-to-IP converters 128 may be deployed at the emergency dispatch center 100 as shown in FIG. 1C. The serial-to-IP converter 128 may be adapted to communicate with the legacy call handling system(s) 120 via one or more serial communication channels according to one or more serial communication protocols, for example, RS-232, RS-422, RS-485 and/or the like.

Via the serial communication channel(s), the serial-to-IP converters 128 may receive, for example, from the legacy call handling system(s) 120, an extension mapping which maps a call ID of each incoming emergency call to an extension ID of a respective one of the plurality of dispatcher terminals 124 assigned to handle respective emergency call.

The serial-to-IP converter 128 may then encapsulate the extension mapping in one or more IP packets and transmit these IP packets encapsulating the extension mapping to the remote server 108.

The serial-to-IP converter 128 may employ and/or utilize one or more communication links, services, and/or protocols for communicating with the remote server 108. For example, the serial-to-IP converter 128 may transmit the extension ID mapping data which maps each of the incoming emergency calls to a respective dispatcher terminal 124 assigned to handle the respective emergency call via one or more Service Activation Gateways (SAG) typically used for service provisioning and activation.

Figure 2:
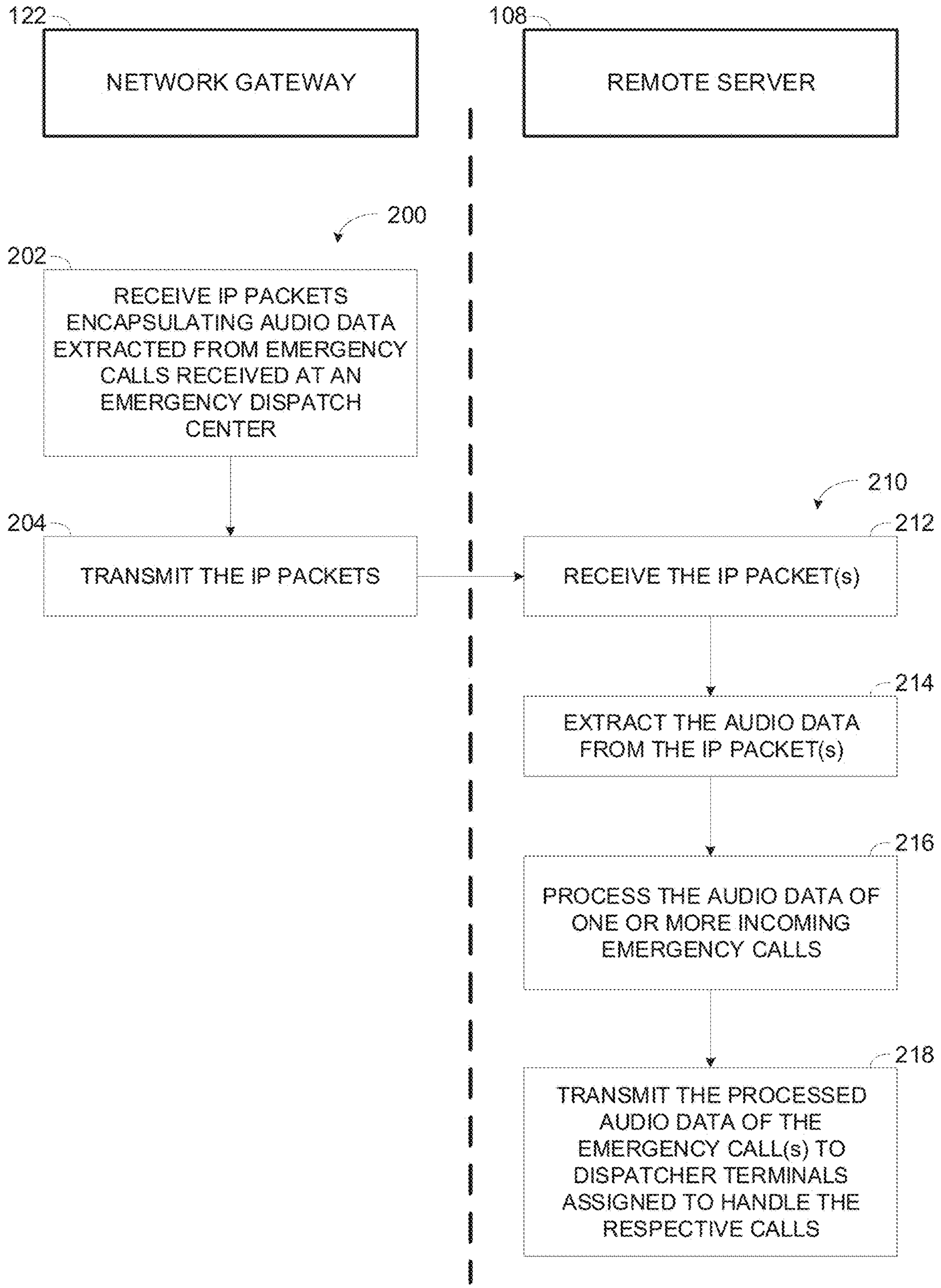
FIG. 2 presents flowcharts of exemplary processes executed for over-the-top delivery of processed audio of emergency calls to dispatcher terminals at an emergency dispatch center, according to some embodiments of the present invention.

Reference is now made to FIG. 2, which presents flowcharts of exemplary processes executed for over-the-top delivery of processed audio of emergency calls to dispatcher terminals at an emergency dispatch center, according to some embodiments of the present invention.

An exemplary process 200 may be executed by a network gateway such as the network gateway 122 deployed at an emergency dispatch center 100 for transmitting IP packets received from one or more call handling systems such as the call handling system 120. The IP packets may encapsulate data, for example audio data extracted from one or more incoming emergency calls received at the emergency dispatch center 100 by the call handling system(s) 120.

An exemplary process 210 may be executed by a remote server such as the remote server 108, specifically by an audio processing engine such as the audio processing engine 112 for processing the data of one or more of the incoming emergency calls, for example, audio data (e.g., speech, voice, sound, etc.) extracted from the IP packets received from the network gateway 122 and transmitting the processed data, over-the-top, to one or more dispatcher terminals such as the dispatcher terminal 124.

For brevity, the processes 200 and 210 are presented for a single emergency dispatch center 100 deployed with a single call handling system 120 and a network gateway 122 which communicates via the network 106 with a single remote server 108. This, however, should not be construed as limiting since as may be apparent to a person skilled in the art, the processes, specifically the process 210 may be expanded for a plurality of network gateway 122 deployed at a plurality of emergency dispatch centers 100. Also, the process 200 executed by the network gateway 122 may be expanded, duplicated, and/or scaled to receive IP packets from a plurality of call handling systems 120 each receiving a plurality of incoming emergency calls.

As shown at 202, the process 200 starts with the network gateway 122 receiving IP packets encapsulating data, for example, audio data extracted from one or more incoming emergency calls received at the emergency dispatch center 100.

The audio data may include, for example, speech data expressing speech of a user (reporter) such as the user 104. In another example, the audio data may include voice data, for example, background voices heard at the background of the user 104, and/or the like. In another example, the audio data may include sound data, for example, sounds captured over the line during one or more of the incoming emergency calls.

Optionally, the IP packets encapsulating data relating to one or more of the incoming emergency calls may further include ANI/ALI data retrieved by the call handling system 120 from the ANI/ALI databases(s) 130 and/or determined according to data retrieved from the ANI/ALI databases(s) 130.

As described herein before, the network gateway 122 may receive the IP packets directly from the call handling system 120 in case the call handling system 120 is capable and adapted to transmit IP packets over the IP based network of the emergency dispatch center 100.

Optionally, in case the call handling system 120 is a legacy system incapable of connecting to the IP network and transmitting IP packets, the IP packets may be received by the network gateway 122 via one or more serial data encapsulation devices such as the serial data encapsulation device 126 adapted to receive at least some of the incoming emergency calls from the call handling system 120 in serial format and encapsulate at least some data excited from the emergency calls, for example, audio data, in IP packets.

As shown at 204, the network gateway 122 may transmit the IP packets to the remote server 108 via the network 106.

Optionally, the network gateway 122 may be adapted to encrypt one or more of the IP packets transmitted to the remote server 108, specifically data encapsulated in the IP packets to increase security, safety and/or privacy of the audio data transmitted via the network 106. The network gateway 122 encrypt the IP packets using one or more encryption protocols, for example, Transport Layer Security (TLS), Secure Sockets Layer (SSL), Message Authentication Code (MAC), a private/public key encryption, a symmetric key encryption and/or the like.

Optionally, the network gateway 122 may be adapted to sign one or more of the IP packets to publish the source (origin) of the IP packet(s) to the receiving party(s), for example, the remote server 108, specifically the audio processing engine 112 such that the receiving party(s) may verify the source of the received IP packet(s) and their validity. The network gateway 122 may sign the IP packets according to one or more message authentication protocols, for example, Message Authentication Code (MAC), private/public authentication key pair, and/or the like.

As shown at 212, the process 210 starts with the audio processing engine 112, executed by the remote server 108, receiving from the network gateway 122, via the network 106, the IP packet(s) encapsulating data extracted from one or more of the incoming emergency calls received at the emergency dispatch center 100, for example, audio data.

As described herein before, the IP packets may optionally further comprise additional data relating to one or more of the incoming emergency calls, for example, ANI/ALI data.

The audio data of each emergency call which is transmitted via the IP packets to the remote server 108 may be associated with an extension ID of a respective one of the plurality of dispatcher terminals 124 which was assigned to take and handle the respective emergency call at the emergency dispatch center 100. As such, each emergency call and its data including its audio data may be associated with the specific dispatcher terminal 124 which takes the respective emergency call and handles it.

The association between the emergency calls, specifically between the audio data of the emergency calls and the dispatcher terminals 124 assigned to handle the emergency calls may be reflected by extension mapping which maps a call ID of each incoming emergency call with a respective extension ID of the dispatcher terminals 124 assigned to handle the respective incoming emergency call.

While the call ID of each emergency call may be typically included in the IP packets encapsulating the audio data of the respective emergency call, the extension mapping, i.e., correlation (association) of the call ID with the extension ID of the dispatcher terminals 124 assigned to handle the respective incoming emergency call may be delivered to the remote server 108 according to one or more configurations, deployments, and/or implementations.

For example, the extension mapping may be embedded in the IP packets transmitted by the network gateway 122 to the remote server 108. For example, assuming the call handling system 120 is adapted to directly connect to the network gateway 122 via IP based network(s) for transferring the data extracted from the incoming emergency calls, for example, audio data in an IP based audio stream constructed according to one or more IP protocols, for example, SIP protocol, RTP protocol, and/or the like. In such case, the call handling system 120 may add, and/or adjust one or more IP packets to add, append, include, inject and/or otherwise embed the extension ID of the respective dispatcher terminal 124 assigned to handle the respective incoming emergency call into the IP packet(s) encapsulating the data, for example, audio data of the respective emergency call.

However, in case the call handling system 120, for example, a legacy serial communication based call handling system 120, is incapable of connecting to the IP based networks, the mapping of the call IDs to the extension IDs may be done via one or more alternative routes, architectures, deployments, and/or implementations.

For example, one or more serial-to-IP converters such as the serial-to-IP converter 128 may be deployed to receive the extension mapping from the legacy call handling system 120 in serial format via the serial communication channel(s) according to the serial communication protocol(s). The serial-to-IP converter 128 may encapsulate the extension mapping in one or more IP packets and transmit these IP packets, encapsulating the extension mapping, to the remote server 108.

As shown at 214, the audio processing engine 112 may extract from the received IP packet(s) the audio data of one or more of the emergency calls received at the emergency dispatch center 100.

As shown at 216, the audio processing engine 112 may process the audio data of one or more of the emergency communications.

The audio processing engine 112 may process the audio data of one or more of the incoming emergency calls in real-time while the incoming emergency calls are in progress such that the processed audio data may be used in real-time, for example, by one or more of the dispatchers at the emergency dispatch center 100, by one or more service monitoring and management systems at the emergency dispatch center 100, by a higher level response service, for example, a regional emergency service, a national emergency service, a federal emergency service, and/or the like, for example, police, emergency medical service, fire department, homeland security service and/or the like.

The audio processing engine 112 may process the audio data of one or more of the incoming emergency calls for one or more objectives, goals and/or purposes, typically in order to assist, improve, and/or enhance handling of the incoming emergency calls by the dispatchers at the emergency dispatch center 100.

For example, processing of the audio data by the audio processing engine 112 may comprise may comprise associating the audio data of one or more of emergency calls received at the emergency dispatch center 100 and handled through the dispatch terminals 124 with other data relating to the respective emergency calls. In particular, the audio processing engine 112 may associate the audio data of an incoming emergency calls with other data relating to the respective emergency call which is displayed, processed, and/or otherwise handled by the respective dispatch terminal 124 handling the respective emergency call.

Such data which the audio processing engine 112 may associate with the audio data may include, for example, image data, and/or video data captured by one or more sensors of the client device 102 used by the user (reporter) 104 to initiate the emergency call. In another example, the other data may include location data, for example, a location of the emergency event reported in the emergency call, a location of the client device 102 used by the user 104, optionally extracted from ANI/ALI data received from the network gateway 122, location of response personnel and/or teams responding to the emergency event reported by the user 104, and/or the like. In another example, the other data may include incident data relating to the emergency event reported by the user 104 in the emergency call, for example, an event type, status of responders, correlation with reports of the same emergency event by other users 104 in one or more other emergency calls, and/or the like.

In another example, processing of the audio data by the audio processing engine 112 may comprise translating the audio data of one or more of the incoming emergency calls to one or more languages different from an original language of the respective emergency call. For example, assuming a certain user 104 initiates an emergency call to a certain emergency dispatch center 100 stuffed with English speaking dispatchers and speaks Spanish. In such case, the audio processing engine 112 may analyze the audio data (content) of the incoming emergency call and translate the audio data of the emergency call from Spanish to English.

In another example, processing of the audio data by the audio processing engine 112 may comprise generating a transcript of one or more of the incoming emergency calls. For example, the audio processing engine 112 may analyze the audio data (content) of one or more of the incoming emergency calls and generate a textual transcript and/or an audible transcript (e.g., synthesized speech transcript).

In another example, processing of the audio data by the audio processing engine 112 may comprise estimating and/or classifying one or more user attributes of one or more users (reporters) 104 who initiated the respective emergency call, for example, an emotional attribute, a behavioral attribute, a sentimental attribute, a physical attribute, and/or the like.

The audio processing engine 112 may apply one or more voice analysis methods, techniques, and/or algorithms as known in the art for identifying, estimating and/or classifying the user attributes. For example, the audio processing engine 112 may analyze physical characteristics of the voice and/or speech of the user 104 during the emergency call, for example, frequencies, pitch, intensity, rhythm, and/or duration of to estimate one or more of his user attributes. In another example, the audio processing engine 112 may semantically analyze the content and/or context of the lingual terms used by the user 104 in the emergency call to estimate one or more of his user attributes. In another example, the audio processing engine 112 may analyze melody of speech, for example, frequency contour, energy, spectral features, and/or the like to identify emotional state (s) of the user 104.

For example, based on analysis of the audio data of a certain emergency call initiated by a certain user 104, the audio processing engine 112 may estimate that the certain user 104 suffers some injury and/or trauma. In another example, based on analysis of the audio data of a first emergency call initiated by a first user 104 to report a certain emergency event, the audio processing engine 112 may estimate that the first user 104 is under a lot of stress while based on analysis of the audio data of a second emergency call initiated by a second user 104 reporting the same emergency event, the audio processing engine 112 may estimate that the second user 104 is significantly calm and composed.

In another example, processing of the audio data by the audio processing engine 112 may comprise computing analytics for a plurality of emergency calls received at the emergency dispatch center based on analysis of the audio data of the plurality of emergency calls. For example, based on analysis of the audio data of a plurality of emergency calls received at the emergency dispatch center 100, the audio processing engine 112 may compute a distribution and/or segmentation of languages used in the emergency calls initiated by the users 104 to report emergency events. In another example, based on analysis of the audio data of a plurality of emergency calls received at the emergency dispatch center 100, the audio processing engine 112 may compute one or more emotional, behavioral and/or sentimental profiles, and/or patterns of the users 104 who initiated the plurality of emergency calls.

Moreover, the audio processing engine 112 may analyze the audio data of one or more of the emergency calls received at the emergency dispatch center 100 in conjunction (together) with additional (other) data relating to the respective emergency calls, for example, incident data, video data, and/or the like. For example, based on analysis of the audio data of a certain emergency call initiated by a certain user 104, the audio processing engine 112 may estimate that the certain user 104 suffers some injury and/or trauma. In such case, the audio processing engine 112 may process additional data relating to the certain emergency call, for example, video data (e.g., images, video stream, etc.) captured by the camera of the client device 102 of the certain user 104, to validate whether the certain user 104 is indeed injured and/or assess its injury, and/or physical condition. In another example, based on analysis of the audio data of a plurality of emergency calls coupled with incident data relating to the emergency events reported in the plurality of emergency calls, the audio processing engine 112 may compute analytics which may be used for creating one or more emotional, behavioral and/or sentimental profiles of the users 104 who initiated the plurality of emergency calls per emergency event type and/or severity.

As shown at 218, the audio processing engine 112 may transmit the processed audio data relating to one or more of the incoming emergency calls to a respective one of the plurality of dispatcher terminals 124 which handles the respective emergency call. The audio processing engine 112 may identify which dispatcher terminal 124 handles each of the emergency calls according to its extension ID, specifically according to the extension ID associated with the audio data of the respective emergency call, for example, the extension ID associated with (mapped by) the call ID of the respective emergency call.

In particular, the audio processing engine 112 may transmit the processed audio data to the dispatcher terminals 124 over-the-top via the IP based network 106.

Optionally, the audio processing engine 112 may be adapted to encrypt the processed audio data the processed audio data transmitted to the dispatcher terminals 124 to increase security, safety and/or privacy of the processed audio data transmitted via the network 106.

Optionally, the audio processing engine 112 may be adapted to sign the IP packets containing the processed audio data transmitted to one or more of the dispatcher terminals 124 to publish to the dispatcher terminals 124 that the audio processing engine 112 is the source (origin) of these IP packet(s) thus allowing the dispatcher terminals 124 to verify the source of the received IP packet(s) and their validity.

The dispatchers receiving the processed audio data via their dispatcher terminals 124 may view, use, and/or analyze the processed audio data. For example, a certain dispatcher may playback on his dispatcher terminal 124 a translated version received from the remote server 108 for a certain emergency call that he handles, i.e., an emergency call routed to his dispatcher terminal 124. In another example, a certain dispatcher may review on his dispatcher terminal 124 a transcript received from the remote server 108 for a certain emergency call that he handles, i.e., an emergency call routed to his dispatcher terminal 124. In another example, a certain dispatcher may evaluate a condition and/or state of a certain user 104 who initiated a certain emergency call that is handled by the certain dispatcher, i.e., an emergency call routed to his dispatcher terminal 124 based on one or more user attributes estimated by the audio processing engine 112 for the certain user 104.

It should be noted that in some dispatch center embodiments, for example, admin calls such municipal service call centers, utilities service call centers, commercial call centers, and/or the like, association between audio data of an incoming call and a specific dispatcher terminal 124 may not be essential. This is since it may not be critical for the same dispatcher to receive audio data relating to the call he is handling. In such case, steps, resources, and/or provisions employed for associating between the audio data of each incoming call and an extension identifying a specific dispatcher terminal 124 may be eliminated, bypassed, and/or discarded.

For example, in step 218 of the process 210, the audio processing engine 112 may not transmit the processed audio to any specific dispatcher terminal 124 and may therefore skip the process of associating between audio data and a specific dispatcher terminal 124 which handles the incoming call from which the audio data was originally extracted. In another example, the serial-to-IP converter 128 may be removed since there is no need for associating between the audio data and specific dispatcher terminals 124.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms client device, call handling system, and over-the-top data are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for delivering over-the-top voice of incoming emergency calls to dispatchers' terminals at emergency dispatch centers, comprising:
- a network gateway deployed in an emergency dispatch center and adapted for:
  - transmitting, via a network, Internet Protocol (IP) packets encapsulating audio data extracted from at least one of a plurality of incoming emergency calls received at the emergency dispatch center, the audio data of the at least one emergency call is associated with an extension identifier (ID) of a respective one of a plurality of dispatcher terminals assigned to take and handle the at least one emergency call at the emergency dispatch center; and
- a remote server adapted for:
  - receiving, via the network, the IP packets encapsulating the audio data of the at least one emergency call,
  - extracting the audio data,
  - processing the audio data, and
  - transmitting the processed audio data relating to the at least one emergency call to a respective one of the plurality of dispatcher terminals according to the extension ID;
- wherein the plurality of incoming emergency calls are received via at least one call handling system deployed at the emergency dispatch center, the at least one call handling system is adapted to route each of the plurality of incoming emergency call to a respective one of the plurality of dispatcher terminals, an extension mapping reflects the association of each of the plurality of incoming emergency calls with a respective one of the plurality of dispatcher terminals assigned to take and handle the respective incoming emergency call.

2. The system of claim 1, wherein the extension mapping is embedded in the IP packets encapsulating the audio data of the at least one emergency call.

3. The system of claim 1, wherein at least some of the plurality of incoming emergency calls are received via at least one legacy call handling system incapable of transmitting IP packets encapsulating data extracted from one or more of the at least some incoming emergency calls.

4. The system of claim 3, wherein at least one serial data encapsulation device adapted for encapsulating data received in serial format is deployed in the emergency dispatch center to encapsulate in IP packets data extracted from the least some incoming emergency calls received from the at least one legacy call handling system in serial data format.

5. The system of claim 3, further comprising at least one serial-to-IP converter deployed in the emergency dispatch center, the at least one serial-to-IP converter is adapted to:
- receive the extension mapping from the at least one legacy call handling system in serial format via at least one serial communication channel,
- encapsulate the extension mapping in at least one IP packet, and
- transmit the at least one IP packet encapsulating the extension mapping to the remote server.

6. The system of claim 1, wherein the remote server is utilized by at least one cloud service.

7. The system of claim 1, wherein the network gateway is configured to encrypt at least one of the IP packets.

8. The system of claim 1, wherein the network gateway is configured to sign at least one of the IP packets.

9. The system of claim 1, wherein at least one of the plurality of incoming emergency calls is identified using an Automatic Number Identifier (ANI)/Automatic Location Identification (ALI) service.

10. The system of claim 1, wherein the processing of the audio data of the at least one emergency call comprises associating the audio data with other data relating to the at least one emergency call at the respective one of the plurality of dispatcher terminals, the other data is a member of a group consisting of: video data, location data, and incident data relating to an emergency event reported by the at least one emergency call.

11. The system of claim 1, wherein the processing of the audio data of the at least one emergency call is conducted in real-time while the at least one emergency call is in progress.

12. The system of claim 1, wherein the processing of the audio data of the at least one emergency call comprises translating the audio data to at least one language different from an original language of the at least one emergency call.

13. The system of claim 1, wherein the processing of the audio data of the at least one emergency call comprises generating a transcript of the at least one emergency call.

14. The system of claim 1, wherein the processing of the audio data of the at least one emergency call comprises estimating at least one emotional, behavioral, and/or sentimental attribute of at least one user who initiated at least one of the plurality of emergency calls.

15. The system of claim 1, wherein the processing of the audio data comprises computing analytics for at least some of the plurality of emergency calls received at the emergency dispatch center based on analysis of the audio data of the at least some emergency calls.

16. The system of claim 1, wherein the network gateway further comprises a plurality of network ports for transferring data relating to the plurality of incoming emergency calls to the plurality of dispatcher terminals.

17. A computer implemented method of delivering over-the-top voice of incoming emergency calls to dispatchers' terminals at emergency dispatch centers, comprising:

using at least one processor of a remote server for:

receiving, via a network, IP packets from a network gateway deployed in at least one emergency dispatch center, the IP packets encapsulate audio data extracted from at least one of a plurality of incoming emergency calls received at the at least one emergency dispatch center, the audio data of the at least one emergency call is associated with an extension identifier (ID) of a respective one of a plurality of dispatcher terminals assigned to take and handle the at least one emergency call at the at least one emergency dispatch center;

extracting the audio data;

processing the audio data; and transmitting the processed audio data relating to the at least one emergency call to a respective one of the plurality of dispatcher terminals according to the extension ID;

wherein the plurality of incoming emergency calls are received via at least one call handling system deployed at the emergency dispatch center, the at least one call handling system is adapted to route each of the plurality of incoming emergency call to a respective one of the plurality of dispatcher terminals, an extension mapping reflects the association of each of the plurality of incoming emergency calls with a respective one of the plurality of dispatcher terminals assigned to take and handle the respective incoming emergency call.

* * * * *